United States Patent
Minikh et al.

(10) Patent No.: US 10,040,985 B2
(45) Date of Patent: Aug. 7, 2018

(54) COMPOSITONS AND METHODS FOR CURING LOST CIRCULATION

(71) Applicant: Schlumberger Technology Corporation, Sugar Land, TX (US)

(72) Inventors: Olga Alexandrovna Minikh, Moscow (RU); Diankui Fu, Kuala Lumpur (MY); Fatma Daou, Rio de Janerio (BR); Bernhard Lungwitz, Wuerzburg (DE)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/300,206

(22) PCT Filed: Mar. 31, 2014

(86) PCT No.: PCT/RU2014/000232
§ 371 (c)(1),
(2) Date: Sep. 28, 2016

(87) PCT Pub. No.: WO2015/152754
PCT Pub. Date: Oct. 8, 2015

(65) Prior Publication Data
US 2017/0152428 A1 Jun. 1, 2017

(51) Int. Cl.
*E21B 33/13* (2006.01)
*E21B 21/00* (2006.01)
*C09K 8/42* (2006.01)
*C09K 8/04* (2006.01)
*C09K 8/32* (2006.01)
*C09K 8/36* (2006.01)
*E21B 33/138* (2006.01)

(52) U.S. Cl.
CPC ............... *C09K 8/426* (2013.01); *C09K 8/04* (2013.01); *C09K 8/32* (2013.01); *C09K 8/36* (2013.01); *E21B 21/003* (2013.01); *E21B 33/138* (2013.01); *C09K 2208/08* (2013.01)

(58) Field of Classification Search
CPC ........ E21B 43/25; E21B 33/13; E21B 21/003; E21B 7/00
See application file for complete search history.

(56) References Cited

U.S. PATENT DOCUMENTS

| 6,581,701 | B2 | 6/2003 | Heying |
| 7,497,258 | B2 | 3/2009 | Savery et al. |
| 7,534,744 | B2 | 5/2009 | Shaarpour |
| 7,870,903 | B2 | 1/2011 | Fang et al. |
| 2008/0108524 | A1 | 5/2008 | Willberg et al. |

(Continued)

FOREIGN PATENT DOCUMENTS

| EP | 2298848 A1 | 3/2011 |
| EP | 2404975 A1 | 1/2012 |
| WO | 1991001430 A2 | 2/1991 |

*Primary Examiner* — Zakiya W Bates

(57) ABSTRACT

Adding shapeable particles to drilling fluids may be useful for curing lost circulation. When the shapeable particles are pumped downhole through the drillpipe and the drillbit, they may deform when exposed to shear as they pass through the drillbit nozzles. While circulating back toward the surface they may relax at least partially and assume the shape of cracks or voids they encounter along the formation wall, thereby stopping losses.

17 Claims, 3 Drawing Sheets

(56) References Cited

U.S. PATENT DOCUMENTS

| | | | |
|---|---|---|---|
| 2008/0113879 A1* | 5/2008 | Way | C09K 8/035 |
| | | | 507/117 |
| 2011/0183874 A1 | 7/2011 | Ghassemzadeh | |
| 2011/0257333 A1 | 10/2011 | Adam et al. | |
| 2013/0296199 A1 | 11/2013 | Ghassemzadeh | |

* cited by examiner

COMPOSITONS AND METHODS FOR CURING LOST CIRCULATION

This application is a 371 National Phase application of International Patent Application No. PCT/RU2014/000232, filed on Mar. 31, 2014, of which is incorporated herein by reference in its entirety.

BACKGROUND

The statements in this section merely provide background information related to the present disclosure and may not constitute prior art.

The present disclosure broadly relates to compositions and methods for controlling lost circulation during the drilling of a wellbore.

During the drilling of a wellbore, various fluids are typically used in the well for a variety of functions. The fluids may be circulated through a drill pipe and drill bit into the wellbore, and then may subsequently flow upward through the wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

Fluid compositions used for these various purposes may be water- or oil-based and may comprise weighting agents, surfactants, proppants, or polymers. However, for a wellbore fluid to perform all of its functions and allow wellbore operations to continue, the fluid must stay in the borehole. Frequently, undesirable formation conditions are encountered in which substantial amounts or, in some cases, practically all of the wellbore fluid may be lost to the formation. For example, wellbore fluid can leave the borehole through large or small fissures or fractures in the formation or through a highly porous rock matrix surrounding the borehole.

Lost circulation is a recurring drilling problem, characterized by loss of drilling mud into downhole formations. It can occur naturally in formations that are fractured, highly permeable, porous, cavernous, or vugular. These earth formations can include shale, sands, gravel, shell beds, reef deposits, limestone, dolomite, and chalk, among others. Other problems encountered while drilling and producing oil and gas include stuck pipe, hole collapse, loss of well control, and loss of or decreased production. An industry survey (James K. Dodson Co.) showed that, during the period 1993-2002, lost circulation problems related to wellbore instability accounted for 44% of non-productive time during the drilling process. With the development of extended reach drilling and the increased emphasis on deep water, lost circulation may account for an even larger share of non-productive time.

Lost circulation may also result from induced pressure during drilling. Specifically, induced mud losses may occur when the mud weight, required for well control and to maintain a stable wellbore, exceeds the fracture resistance of the formations. A particularly challenging situation arises in depleted reservoirs, in which the drop in pore pressure weakens hydrocarbon-bearing rocks, but neighboring or inter-bedded low permeability rocks, such as shales, maintain their pore pressure. This can make the drilling of certain depleted zones impossible because the mud weight required to support the shale exceeds the fracture pressure of the sands and silts.

Fluid losses are generally classified in four categories. Seepage losses are characterized by losses of from about 0.16 to about 1.6 $m^3$/hr (about 1 to about 10 bbl/hr) of mud. They may be confused with cuttings removal at the surface. Seepage losses sometimes occur in the form of filtration to a highly permeable formation. A conventional LCM, particularly sized particles, is usually sufficient to cure this problem. If formation damage or stuck pipe is the primary concern, attempts are generally made to cure losses before proceeding with drilling. Losses greater than seepage losses, but less than about 32 $m^3$/hr (about 200 bbl/hr), are defined as partial losses. In almost all circumstances when losses of this type are encountered, regaining full circulation is required. Sized solids alone may not cure the problem. When losses are between about 32-48 $m^3$/hr (200-300 bbl/hr), they are called severe losses, and conventional LCM systems may not be sufficient. Severe losses particularly occur in the presence of wide fracture widths. As with partial losses, regaining full circulation is required. If conventional treatments are unsuccessful, spotting of LCM or viscous pills may cure the problem. The fourth category is total losses, when the fluid loss exceeds about 48 $m^3$/hr (about 300 bbl/hr). Total losses may occur when fluids pumped past large caverns or vugs. In this case, the common solution is to employ cement plugs and/or polymer pills, to which LCM may be added for improved performance. An important factor, in practice, is the uncertainty of the distribution of zones of these types of losses, for example, a certain size fracture may result in severe loss or total loss depending on the number of such fractures downhole.

The use of fibers and solids to prevent lost circulation during drilling operations has been widely described. Such fibers include, for example, jute, flax, mohair, lechuguilla fibers, synthetic fibers, cotton, cotton linters, wool, wool shoddy, and sugar cane fibers. One known process for preventing or treating lost circulation involves the addition, at concentrations ranging between about 1.43 and about 17.1 $kg/m^3$ of water-dispersible fibers having a length between about 10 and about 25 mm, for instance glass or polymer fibers, to a pumped aqueous base-fluid including solid particles having an equivalent diameter of less than about 300 microns. Another known process utilizes melt-processed inorganic fibers selected from basalt fibers, wollastonite fibers, and ceramic fibers. Such known methods and compositions, however, typically require large amounts of fibers.

SUMMARY

The present disclosure reveals compositions and methods by which escape of wellbore fluids into subterranean formations may be minimized or prevented.

In an aspect, embodiments relate to drilling fluid compositions. The compositions comprise an aqueous fluid, an oil-based fluid or a water-in-oil emulsion, and one or more shapeable materials having a Young's modulus between 0.01 MPa and 100 MPa.

In a further aspect, embodiments relate to methods drilling a well penetrating a subterranean formation that has one or more lost circulation zones. A drilling fluid is prepared that comprises one or more shapeable materials having a Young's modulus between 0.01 MPa and 100 MPa. The drilling fluid is pumped into the wellbore through an interior portion of a drillpipe and through a drillbit equipped with nozzles. The shapeable materials are allowed to deform upon passage through the nozzles and, while circulating the drilling fluid to a surface location, the shapeable materials enter and plug the lost circulation zones.

In yet a further aspect, embodiments relate to methods for curing lost circulation in a wellbore penetrating a subterranean formation that has one or more lost circulation zones. A drilling fluid is prepared that comprises one or more shapeable materials having a Young's modulus between 0.01 MPa and 100 MPa. The drilling fluid is pumped into the wellbore through an interior portion of a drillpipe and through a drillbit equipped with nozzles. The shapeable materials are allowed to deform upon passage through the nozzles and, while circulating the drilling fluid to a surface location, the shapeable materials enter and plug the lost circulation zones.

DETAILED DESCRIPTION

Figure 1:
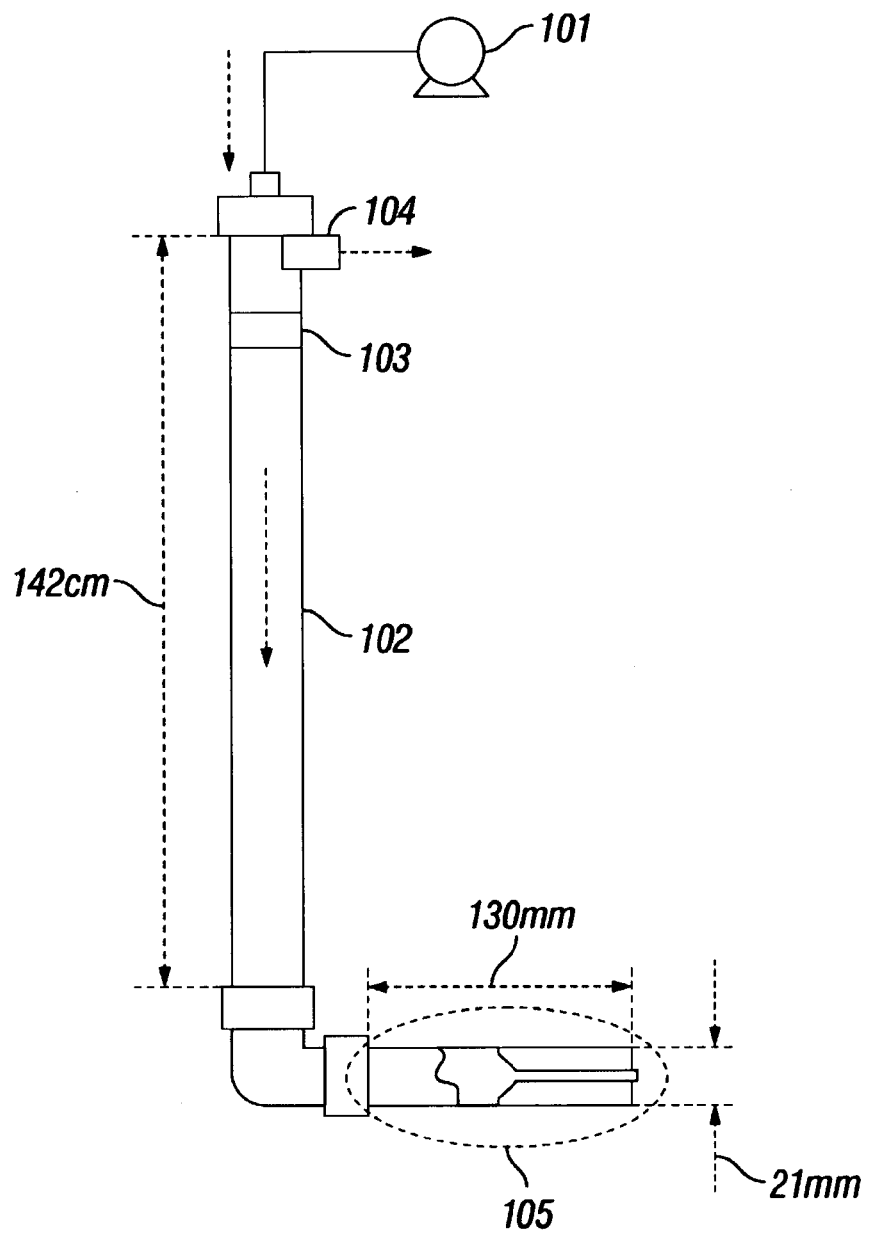
FIG. 1 shows a schematic diagram of the lost-circulation testing apparatus used in the foregoing examples.

Although the following discussion emphasizes blocking fractures encountered during drilling, the fibers and methods of the disclosure may also be used during cementing and other operations in which fluid loss or lost circulation are encountered. The disclosure will be described in terms of treatment of vertical wells, but is equally applicable to wells of any orientation. The disclosure will be described for hydrocarbon-production wells, but it is to be understood that the disclosed methods can be used for wells for the production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the Applicants appreciate and understand that any and all data points within the range are to be considered to have been specified, and that the Applicants have possession of the entire range and all points within the range.

Applicants have determined that severe to total losses as described above may be mitigated by incorporating shapeable materials into drilling fluids. In this disclosure, "shapeable materials" are those that may deform under an applied force, then return totally or partially to their original shape when the force is removed. Thus, when these materials are placed in contact with a crack or void, they deform and assume shapes that will fill the space available to plug the crack or void. The shapeable materials may be self-degrading, thus allowing operators to continue drilling without having to perform clean-out operations to remove a lost circulation plug.

When the shapeable particles of the disclosure are pumped downhole through the drillpipe and the drillbit, they may deform when exposed to shear as they pass through the drillbit nozzles. While circulating back toward the surface they may at least partially relax, depending on the particles' ability to resist the applied force and the particle properties themselves. When the drilling fluid encounters cracks or voids, there is an elevated shear at the entrance of the fracture resulting from fluid loss. Under this elevated shear the shapeable materials may deform, easing their entry into the fracture. As the particles move further into the fracture, the drilling fluid velocity and shear decrease, and the particles may relax and assume the shape of the space available to plug the crack or void, thereby stopping losses.

In an aspect, embodiments relate to drilling fluid compositions. The compositions comprise an aqueous fluid, an oil-based fluid or a water-in-oil emulsion, and one or more shapeable materials having a Young's modulus between 0.01 MPa and 100 MPa.

In a further aspect, embodiments relate to methods drilling a well penetrating a subterranean formation that has one or more lost circulation zones. A drilling fluid is prepared that comprises one or more shapeable materials having a Young's modulus between 0.01 MPa and 100 MPa. The drilling fluid is pumped into the wellbore through an interior portion of a drillpipe and through a drillbit equipped with nozzles. The shapeable materials are allowed to deform upon passage through the nozzles and, while circulating the drilling fluid to a surface location, the shapeable materials enter and plug the lost circulation zones.

In yet a further aspect, embodiments relate to methods for curing lost circulation in a wellbore penetrating a subterranean formation that has one or more lost circulation zones. A drilling fluid is prepared that comprises one or more shapeable materials having a Young's modulus between 0.01 MPa and 100 MPa, or between 10 MPa and 100 MPa or between 50 MPa and 100 MPa. The drilling fluid is pumped into the wellbore through an interior portion of a drillpipe and through a drillbit equipped with nozzles. The shapeable materials are allowed to deform upon passage through the nozzles and, while circulating the drilling fluid to a surface location, the shapeable materials enter and plug the lost circulation zones.

For all aspects, the particle size of the shapeable particle may be between 10 µm and 5.0 mm, or between 100 µm and 5.0 mm or between 1.0 mm and 5.0 mm. The shapeable particles may comprise degradable particles, non-degradable particles or both.

For all aspects, the degradable particles may comprise polyhydroxyalkonates, poly(3-hydroxybutyrate), polyhydroxyvalerate, polybutylene adipate-coterephthalate, polybutylene succinate, polycaprolactone, polylactic acid, polyethylenterephthalate, polyesters, guar churi, or copolymers thereof or combinations thereof. The degradable particles may comprise guar churi.

For all aspects, the non-degradable particles may comprise elastomers compounded with an aqueous inverse emulsion of polymer particles comprising a betaine group, styrene butadiene rubber, ground rubber, poly-2,2,2-bicycloheptene, alkylstyrene or ethylene propylene diene rubber or combinations thereof. The polymer particles comprising a betaine group may comprise substituted or unsubstituted compounds chosen including alkylphosphonates of dialkylammonioalkyl acrylates, alkylphosphonates of dialkylammonioalkyl methacrylates, alkylphosphonates of dialkylammonioalkyl acrylamides, alkylphosphonates of dialkylammonioalkyl methacrylamides, alkylsulphonates of dialkylammonioalkyl acrylates, alkylsulphonates of dialkylammonioalkyl methacrylates, alkylsulphonates of dialkylammonioalkyl acrylamides, alkylsulphonates of dialkylammonioalkyl methacrylamides, alkylphosphonates of dialkylammonioalkoxyalkyl acrylates, alkylphosphonates of dialkylammonioalkoxyalkyl methacrylates, alkylphosphonates of dialkylammonioalkoxyalkyl acrylamides, alkylphosphonates of dialkylammonioalkoxyalkyl methacrylamides, alkylsulphonates of dialkylammonioalkoxyalkyl acrylates, alkylsulphonates of dialkylammonioalkoxyalkyl methacrylates, alkylsulphonates of dialkylammonioalkoxyalkyl acrylamides, alkylsulphonates of dialkylammonioalkoxyalkyl methacrylamides, heterocyclic betaine monomers, alkylphosphonates of dialkylammonioalkylallylics, alkylsulphonates of dialkylammonioalkylallylics, alkylphosphonates of dialkylammonioalkylstyrenes, alkylsulphonates of dialkylammonioalkylstyrenes, or betaines resulting from ethylenically unsaturated anhydrides and dienes or combinations thereof. The polymers may or may not be crosslinked.

For all aspects, the degradable or non-degradable particles may be fibrous, spheroidal, ribbons, flakes or films or combinations thereof.

For all aspects, the shapeable particles may swell when immersed in an oil-base fluid or in an aqueous fluid.

For all aspects, the drilling fluid may further comprise calcium hydroxide, magnesium hydroxide, persulfates, bromates or peroxides or combinations thereof. Such agents may accelerate the degradation of the plug, thereby facilitating resumption of drilling. These agents may also be encapsulated, allowing delay of the degradation until the materials pass through the drill bit or at a later time.

For all aspects, the drilling fluid may further comprise lost circulation materials in the form of fibers, particles, ribbons, flakes or films or combinations thereof.

EXAMPLES

The present disclosure may be further understood from the following examples.

Fluid blocking tests were performed in the laboratory with the following materials. The base fluid was MUDPUSH™ II, a water-base fluid from Schlumberger, Houston, Tex., USA.

The shapeable particle was guar churi, a byproduct of the manufacture of guar gum. The initial particle size of the guar churi was such that the $d_{50}$ was 24 □m and the $d_{90}$ was 224 □m.

The test formulation was a MUDPUSH™ II fluid containing 140 g/L guar churi particles. The fluid was mixed for 15 min at 750 RPM in a Cole-Parmer overhead mixer. The fluid density was 1010 kg/m³.

Example 1

Flow tests were performed with a bridge testing device. The device comprised a metal tube filled with the formulation to be tested, pushed through a slot of varying diameter with an HPLC pump pumping water. The maximum flow rate was 1 L/min. Pressure was monitored with a pressure transducer (available from Viatran, Inc.), and the device could be operated at a maximum pressure of 500 psi (3.5 MPa). The apparatus was constructed by the Applicants, and was designed to simulate fluid flow into a formation-rock void. A schematic diagram is shown in FIG. 1.

A pump 101 was connected to a tube 102. The internal tube volume was 500 mL. A piston 103 was fitted inside the tube. A pressure sensor 104 was fitted at the end of the tube between the piston and the end of the tube that was connected to the pump. A slot assembly 105 was attached to the other end of the tube.

Figure 2:
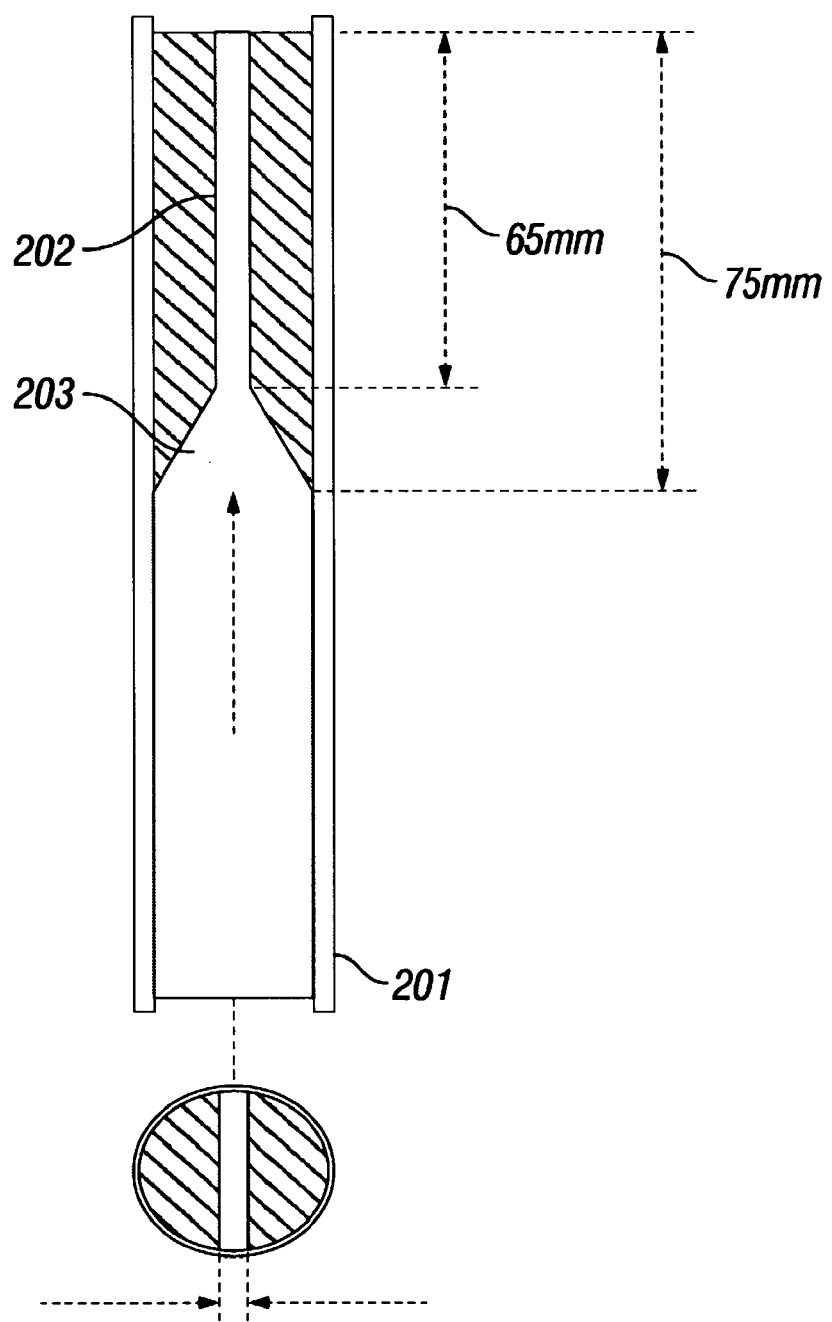
FIG. 2 shows a magnified view of a cylinder in which a slot has been cut. The slot simulates an opening in the formation rock of a subterranean well.

A detailed view of the slot assembly is shown in FIG. 2. The outer part of the assembly was a tube 201 whose dimensions are 130 mm long and 21 mm in diameter. The slot 202 was 65 mm long. Various slots were available with widths varying between 1 mm and 5 mm. Preceding the slot was a 10-mm long tapered section 203.

During the experiments, the tested slurries were pumped through the slot. If plugging took place, a rapid pressure rise was observed. The test terminated when the pressure reached the 3.5 MPa (500-psi) limit.

For each of the tests, 500 mL of the MUDPUSH™ II formulation was placed in the tube. Then the piston was placed into the tube and the apparatus was connected to the pump. The flow rate through the apparatus was varied from 100 mL/min to 1000 mL/min. For a slot width of 1.5 mm, this range corresponded to 5.3 cm/s to 53 cm/s through the slot. For a slot width of 3.0 mm, this range corresponded to 2.6 cm/s to 26 cm/s through the slot.

Testing was first performed with the 3-mm slot at a flow rate of 100 mL/min. No plugging was observed—only a 0.35-MPa pressure increase. All 500 mL passed through the slot. After disassembly of the apparatus, however, the coarse fraction of the particles was observed to have remained in the slot.

Further testing was performed with the 1.5-mm slot. Four experiments were conducted during which the flow velocities were 5, 16, 26 and 53 cm/s. In each case the slot became plugged. Visual inspection of the slots revealed that the guar churi particles had altered their shapes to fill the slot.

Example 2

In this example, the test apparatus was a modified 500-mL API fluid-loss cell. The API cells are available from Fann Instruments, Houston, Tex., USA. A schematic diagram is presented in FIG. 3.

Figure 3:
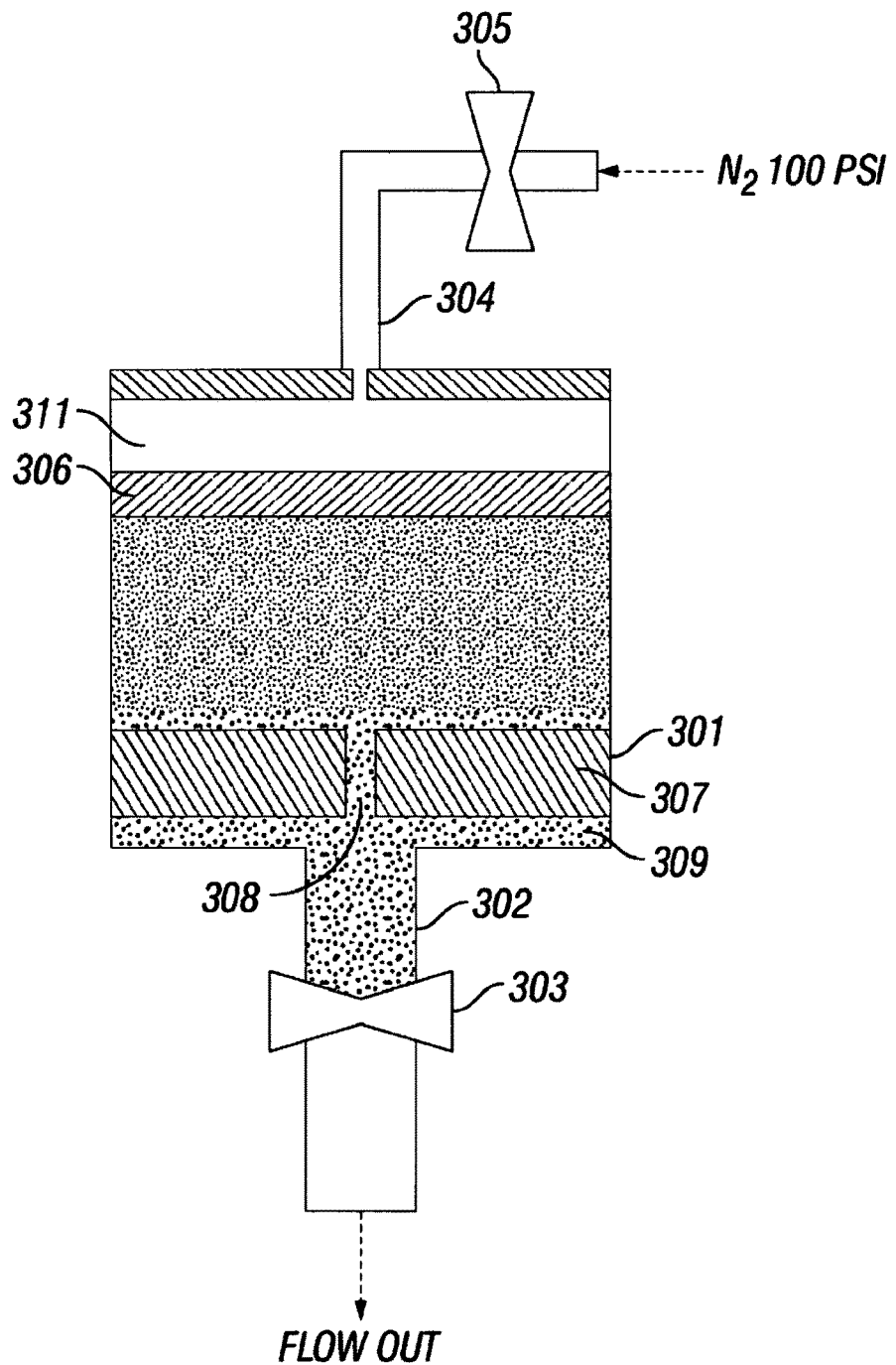
FIG. 3 shows a schematic diagram of a modified fluid-loss cell for lost-circulation testing.

The cell was equipped with modified slits through a grid, or a cylinder approximately 50 mm high having either a 1 mm to 3 mm slot or 1 mm to 3 mm holes. FIG. 3 shows the arrangement with a slot.

The experimental apparatus consisted essentially of a high-pressure high-temperature fluid loss cell 301 that is equipped with a 2.54-cm (1-in.) tube 302 and a valve 303 at the bottom of the cell. At the top of the cell was an inlet 304 and a valve 305 that was connected to a nitrogen line. Inside the cell was a steel piston 306 and a cylinder 307 into which a slot 308 had been cut. The cylinder was replaceable and cylinders were available with various slot widths. In this example the slot width was 7/32 in. (5.6 mm), corresponding to the size of drill bit nozzles.

During a test, 500 mL of MUDPUSH™ II fluid was placed into the modified fluid-loss cell. The metal piston was placed on top of the fluid in the cell. The cell was closed and connected to the nitrogen line. The nitrogen pressure was 0.69 MPa (100 psi). When the bottom valve was opened, all of the fluid passed through the slot, indicating that the guar churi (at a concentration of 140 g/L) could be pumped through drill bit nozzles.

Although various embodiments have been described with respect to enabling disclosures, it is to be understood that this document is not limited to the disclosed embodiments. Variations and modifications that would occur to one of skill in the art upon reading the specification are also within the scope of the disclosure, which is defined in the appended claims.

The invention claimed is:

1. A drilling fluid composition, comprising:
   (i) an aqueous fluid, an oil-base fluid or a water-in-oil emulsion;
   (ii) one or more shapeable materials having a Young's modulus between 0.01 MPa and 100 MPa, the shapeable materials comprising degradable particles,
   wherein shapeable is defined as an ability to deform when exposed to shear and to at least partially relax after the shear is reduced.

2. The composition of claim 1, wherein the particle size of the shapeable particles is between 10 µm and 5.0 mm.

3. The composition of claim 1, wherein the degradable particles comprise polyhydroxyalkonates, poly(3-hydroxybutyrate), polyhydroxyvalerate, polybutylene adipate-co-terephthalate, polybutylene succinate, polycaprolactone, polylactic acid, polyethylenterephthalate, guar churi, or copolymers thereof or combinations thereof.

4. The composition of claim 1, wherein the composition further comprises non-degradable particles comprising elastomers compounded with an aqueous inverse emulsion of polymer particles comprising a betaine group, poly-2,2,2-bicyto clo-heptene, alkylstyrene or ethylene propylene diene rubber or combinations thereof.

5. The composition of claim 1, wherein the shapeable particles swell when immersed in an oil-base fluid or in an aqueous fluid.

6. The composition of claim 1, wherein the drilling fluid further comprises calcium hydroxide, magnesium hydroxide, persulfates, bromates or peroxides or combinations thereof.

7. The composition of claim 1, wherein the drilling fluid further comprises lost circulation materials in the form of fibers, particles, ribbons, flakes or films or combinations thereof.

8. A method for drilling a well having a wellbore penetrating a subterranean formation that has one or more lost circulation zones, comprising:
   (i) preparing a drilling fluid comprising one or more shapeable materials having a Young's modulus between 0.01 MPa and 100 MPa, the shapeable materials comprising degradable particles;
   (ii) pumping the drilling fluid into the wellbore through an interior portion of a drillpipe, through a drillbit equipped with nozzles;
   (iii) allowing the shapeable materials to deform upon passage through the nozzles; and
   (iv) circulating the drilling fluid to a surface location and allowing the shapeable materials to enter and plug-the lost circulation zones,
   wherein shapeable is defined as an ability to deform when exposed to shear and to at least partially relax after the shear is reduced.

9. The method of claim 8, wherein the particle size of the shapeable particles is between 10 µm and 5.0 mm.

10. The method of claim 8, wherein the degradable particles comprise polyhydroxyalkonates, poly(3-hydroxybutyrate), polyhydroxyvalerate, polybutylene adipate-co-terephthalate, polybutylene succinate, polycaprolactone, polylactic acid, polyethylenterephthalate, guar churi or copolymers thereof or combinations thereof.

11. The method of claim 8, wherein the drilling fluid further comprises non-degradable particles comprising elastomers compounded with an aqueous inverse emulsion of polymer particles comprising a betaine group, poly-2,2,2-bicyclo-heptene, alkylstyrene or ethylene propylene diene rubber or combinations thereof.

12. The method of claim 8, wherein the shapeable particles swell when immersed in an oil-base fluid or in an aqueous fluid.

13. The method of claim 8, wherein the drilling fluid further comprises calcium hydroxide, magnesium hydroxide, persulfates, bromates or peroxides or combinations thereof.

14. The composition of claim 8, wherein the drilling fluid further comprises lost circulation materials in the form of fibers, particles, ribbons, flakes or films or combinations thereof.

15. A method of curing lost circulation in a wellbore penetrating a subterranean formation that has one or more lost circulation zones, comprising:
   (i) preparing a drilling fluid comprising one or more shapeable materials having a Young's modulus between 0.01 MPa and 100 MPa, the shapeable materials comprising degradable particles;
   (ii) pumping the drilling fluid into the wellbore through an interior portion of a drillpipe, through a drillbit equipped with nozzles;
   (iii) allowing the shapeable materials to deform upon passage through the nozzles; and
   (iv) circulating the drilling fluid to a surface location and allowing the shapeable materials to enter and plug the lost circulation zones,
   wherein shapeable is defined as an ability to deform when exposed to shear and to at least partially relax after the shear is reduced.

16. The method of claim 15, wherein the degradable particles comprise polyhydroxyalkonates, poly(3-hydroxybutyrate), polyhydroxyvalerate, polybutylene adipate-co-terephthalate, polybutylene succinate, polycaprolactone, polylactic acid, polyethylenterephthalate, guar churi or copolymers thereof or combinations thereof.

17. The method of claim 15, wherein the drilling fluid further comprises non-degradable particles comprising elastomers compounded with an aqueous inverse emulsion of polymer particles comprising a betaine group, poly-2,2,2-bicyclo-heptene, alkylstyrene or ethylene propylene diene rubber or combinations thereof.

* * * * *